MAXON & KINYON.
Sled Brake.
No. 88,655.
Patented April 6, 1869.
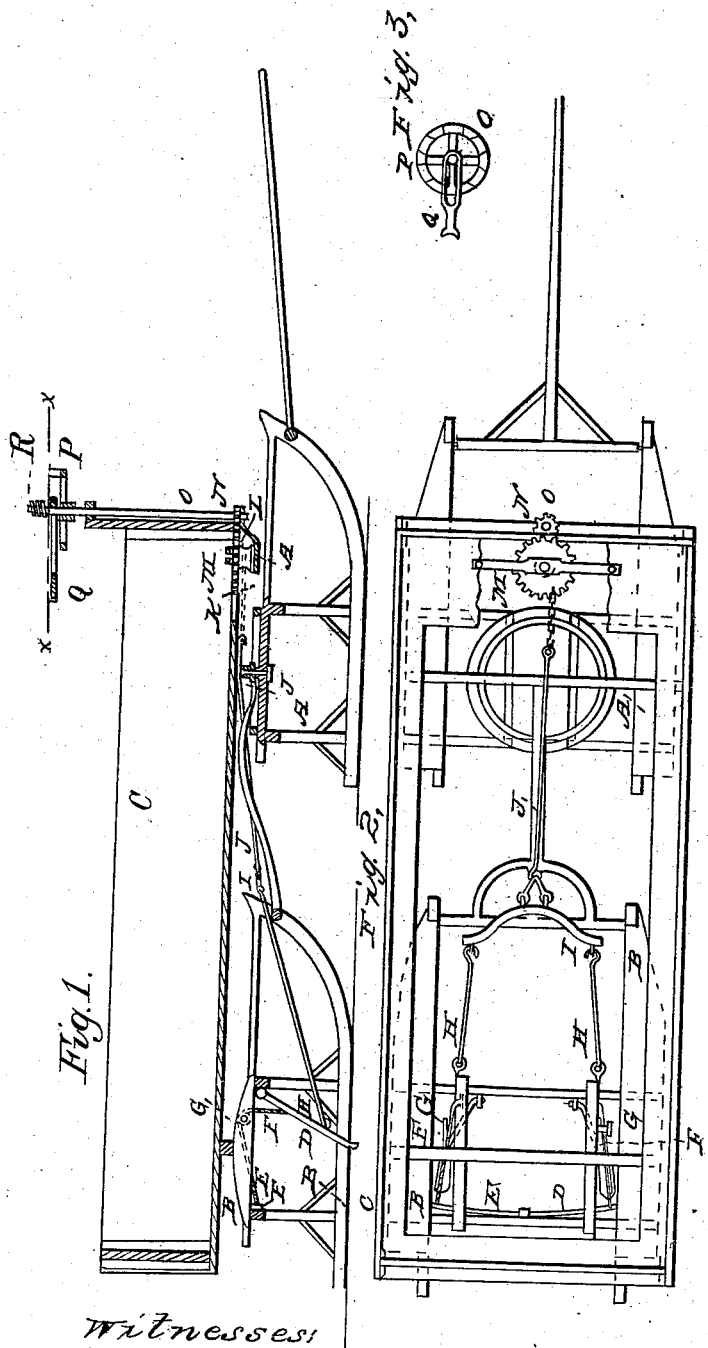

JOHN MAXSON, AND WARREN KINYON, OF SCOTT, NEW YORK.

Letters Patent No. 88,655, dated April 6, 1869.

IMPROVEMENT IN SLED-BRAKES.

The Schedule referred to in these Letters Patent and making part of the same.

*To all whom it may concern:*

Be it known that we, JOHN MAXSON and WARREN KINYON, of Scott, in the county of Cortland, and State of New York, have invented a new and useful Improvement in Sleigh-Brakes; and we do hereby declare that the following is a full, clear, and exact description thereof, which will enable others skilled in the art to make and use the same, reference being had to the accompanying drawings, forming part of this specification, in which—

Figure 1 is a vertical longitudinal section of a bob-sleigh, to which our improved brake has been attached.

Figure 2 is a top view of the same, the bottom of the sleigh-box being broken away.

Figure 3 is a detail top view of the hand-wheel and lever, partly in section through the line x x, fig. 1.

Similar letters of reference indicate corresponding parts.

Our invention has for its object to furnish an improved sleigh-brake, designed especially for bob-sleighs, but equally applicable to other sleighs, and which shall be so constructed that it may be conveniently reached and operated by the driver, and which will be entirely out of the way; and It consists in the construction and combination of the various parts of the brake, as hereinafter more fully described A is the forward bob, B is the rear bob, and C is the box of the sleigh, about the construction of which parts there is nothing new.

D are the brake-dogs, two of which are used, and which are pivoted to the forward beam of the rear bob B, between the runners, as shown in fig. 2.

The dogs D, when not in use, are held away from the roadway by the spring E, the middle part of which is attached to the middle part of the rear beam of the rear bob, and each end of which is connected with one of the dogs D by the ropes or chains F, which pass over the guide-pulleys G, so as to bring them into proper position for lifting the said dogs D.

To each of the dogs D is attached the rear end of a bar, H, which passes beneath the forward beam of the rear bob B, and which we prefer to make jointed.

The forward ends of the bars H are attached to the ends of the cross-bar, or evener I, which, for convenience, we place at or near the forward end of the rear bob B.

To the middle part of the bar I are attached the rear ends of the bar J, which passes forward through a notch, or slot in the bolster of the forward bob A, and to its end is attached the rear end of the chain K, the forward end of which is attached to the drum, or pulley L, the shaft of which works in bearings attached to the sleigh-box C.

To the shaft of the pulley L is attached a gear-wheel, M, into the teeth of which mesh the teeth of the gear-wheel N, attached to the lower end of the vertical shaft O, which passes up along the forward end of the sleigh-box C, and works in bearings attached to said box.

P is a hand-wheel, adjustably secured to the upper part of the shaft O by a pin passing through a hole, or notch in the lower part of the hub of the hand-wheel P, and through one or the other of the holes through the shaft O, so that the height of the said hand-wheel P may be adjusted as the height of the sleigh-box, seat, or load may require to bring the said hand-wheel into a convenient position to be operated by the driver.

The upper side of the hand-wheel P is notched, or grooved radially, to receive the lever Q, through a slot in the forward end of which the shaft O passes, as shown in figs. 1 and 3, so that the said lever may be conveniently drawn out, and used for operating the brake when the said brake requires to be applied with much power. In ordinary cases, the brake may be applied, by means of the hand-wheel P, without drawing out the lever Q.

The lever Q is held down upon the hand-wheel P by a coiled spring, R, placed upon the shaft O, the upper end of which rests against a pin passed through one or the other of the holes through the said shaft O, according to the position in which the hand-wheel P has been adjusted.

This construction and arrangement of the parts of the brake allows the dogs D to act each independently of the other; that is to say, either of said dogs may continue to act while the other gives, to pass over an obstruction.

We claim as new, and desire to secure by Letters Patent—

1. The combination of the dogs D, chain, F, spring E, jointed bars H, or equivalent, and cross-bar, or evener I, with each other substantially as herein shown and described, and for the purpose set forth.

2. The combination of the hand-wheel P, shaft O, gear-wheels N and M, drum, or pulley L, chain, K, and bar J, or equivalent, with each other, and with the evener I, bars H, dogs D, chains F, and spring E, substantially as herein shown and described, and for the purpose set forth.

3. The sliding lever Q and coiled spring R, in combination with the hand-wheel P and shaft O, substantially as herein shown and described, and for the purpose set forth.

JOHN MAXSON.
WARREN KINYON.

Witnesses:
WM. D. HUNT,
JOHN STOKER.